(12) United States Patent
Chu

(10) Patent No.: US 6,320,987 B1
(45) Date of Patent: Nov. 20, 2001

(54) PRE-DCT RESIDUE FILTER

(75) Inventor: Chung-Tao Chu, Santa Clara, CA (US)

(73) Assignee: Neo Paradigm Labs, Inc., Milpitas, CA (US)

(*) Notice: Subject to any disclaimer, the term of this patent is extended or adjusted under 35 U.S.C. 154(b) by 0 days.

(21) Appl. No.: 09/174,817

(22) Filed: Oct. 16, 1998

(51) Int. Cl.[7] ................................................ G09G 5/36
(52) U.S. Cl. ...................................... 382/260; 382/261
(58) Field of Search ..................................... 382/260–269

(56) References Cited

U.S. PATENT DOCUMENTS

| | | | |
|---|---|---|---|
| 5,821,915 | * 10/1998 | Graham et al. | 345/138 |
| 5,917,955 | * 6/1999 | Kojima | 382/266 |
| 6,052,484 | * 4/2000 | Kobayashi | 382/195 |
| 6,141,461 | * 10/2000 | Carlini | 382/261 |

* cited by examiner

*Primary Examiner*—Thomas D. Lee
*Assistant Examiner*—Stephen Brinich
(74) *Attorney, Agent, or Firm*—Sierra Patent Group, Ltd.

(57) ABSTRACT

An apparatus for processing a video signal is described, comprising a means for receiving a nonreconstructed, video residue image, a means for selecting a first pixel to be processed, a means for selecting a second and third pixel, the second and third pixels being contiguous to said first pixel, and positioned right and left of the first pixel, a means for determining first, second, and third weighting factors for the first, second and third pixels respectively, a means for computing a first result by multiplying the first weighting factor with the value of said first pixel, a means for computing a second result by multiplying the second weighting factor with the value of the second pixel, a means for computing a third result by multiplying the third weighting factor with the value of the third pixel; and a means for computing a new value for said first pixel by adding the first, second and third results together.

8 Claims, 5 Drawing Sheets

PRE-DCT RESIDUE FILTER

BACKGROUND OF THE INVENTION

1. Field of the Invention

The present invention relates to video signal processing. More particularly, the present invention related to a method and apparatus for filtering a digital video signal prior to performing DCT and Quantization operations on the resultant signal.

2. The Background Art

In order to minimize the bandwidth required when transmitting video signals from one location to another, the video signals are often compressed to decrease the amount of data that will later be transmitted over a band width limited transmission path.

Many compression routines exist today which use Discrete Cosine Transform (DCT) and Quantization operations known to those of ordinary skill in the art. Some of these compression routines include various forms of MPEG compression such as MPEG-I, MPEG-II, and MPEG-4, and other compression routines such as H.261, and H.263.

Reference designations appearing in more than one figure are intended to refer to substantially similar structures. Effort is made to identify differences between figures, if any.

FIG. 1 is a schematic diagram of a generalized video processing system.

Referring to FIG. 1, video source 10 provides a video signal to source driver 14 which converts the RGB signal out of source 12 into YUV format. YUV is a digital representation well known to those of ordinary skill in the art.

The output of driver 14 is then processed by digital signal processor (DSP) 16, and either processed by display driver 18 to be displayed on display 20, or to be sent to a transmitting station over transmission lines 22.

The processing performed by DSP 16 can be as simple as compressing the video for transmission over transmission lines 22, or may also involve filtering to counter adverse effects inherent in the compression routine which cause the output signal to be inaccurately reproduced when decompression and display take place within a receiving station.

Briefly, between two images, motion compensation techniques are used to find image residue, which has smaller than expected values than the original image. The residue image is then transformed using DCT. DCT is a transform well known to those of ordinary skill in the art.

In order to digitize and achieve a satisfactory compression, DCT coefficients are quantized before Huffman Coding. However, the combination of quantization and DCT causes ringing and other artifacts in the reconstructed images, especially when the quantization step is large.

To reduce these artifacts, filters can be applied during the coding and decoding processes. Several in-loop filters have been introduced in video coding standards.

Two compression algorithms in common use in the video processing, and which utilize filtering schemes, are H.261 and H.263. These two filtering schemes will be briefly described, and their respective disadvantages noted.

FIG. 2 is a schematic diagram of a prior art DSP using the H.261 algorithm and in-loop filtering.

Referring to FIG. 2, an incoming video signal is provided into DSP 16 to a difference apparatus 30 which computes the pixel-by-pixel difference between the incoming data block and the previous data block, providing the output signal through a switch 32 to a DCT apparatus 34.

DCT apparatus 34 performs DCT operations, operations which are required for all forms of MPEG, H.261, and H.263 compression. DCT operations and the specific requirements of MPEG compression are well-known to persons of ordinary skill in the art.

Following DCT operations, the output of DCT apparatus 34 is provided to quantizer 36 where quantizing steps well known to those of ordinary skill in the art are performed. The output of quantizer 36 is provided to transmission path 22 (FIG. 1), and also to inverse quantizer 38. As described earlier, the signal provided to transmission path 22 is provided over long distances to a receiver which decompresses the signal into a display frame, and then provides that display frame to a display device (receiver and display device not shown).

Inverse quantizer 38 and inverse DCT apparatus 40 together invert the compression previously accomplished, and provide the resulting signal to a summing apparatus 42, the output of which is provided to picture buffer 44, the output of which is then filtered by filter 46.

Depending on the condition of switch 48, the output of filter 46 is provided either to summing apparatus 42, or to difference apparatus 30.

Switches 32 and 48 are ganged switches controlled by coding controller 50. If both of switches 32 and 48 are in position "A", the system operates on previously stored data, filtering the data already present in picture buffer 44, passing it through the DCT and Quantization apparatus, and back thru the inverse quantization apparatus and the inverse DCT apparatus 40, and back into picture buffer 44. In this mode, difference apparatus 30 and summing apparatus 42 are bypassed, since there is no comparison needing to be made with a previous block of video data.

Alternatively, if both of switches 32 and 48 are in position "B", DSP 16 accepts new video data, compares, using difference apparatus 30, new image data to old data which has been previously stored and then filtered, and then performs DCT and Quantization functions on the result.

When switches 32 and 48 are in position "B", thus switching filter 46 into the processing path, reconstructed images are filtered, resulting in smoother images as well as less data required to be transmitted over transmission lines 22. However, a significant drawback of this prior art filtering solution is that the filter coefficients are fixed, and therefore there is little or no flexibility to change the filtering based upon the type of images arriving from the external environment to difference apparatus 30. Thus, filter 46 only has on-off control.

FIG. 3 is a schematic diagram of a prior art DSP using the H.263 algorithm and in-loop filtering.

Referring to FIG. 3, DSP 16 comprises the same features and structures as the apparatus of FIG. 2, except for the absence of filter 46 from FIG. 2, and the presence of new filter 60 in FIG. 3.

The apparatus of FIG. 3 functions substantially similarly to the apparatus of FIG. 2, except for the difference in the filtering. Filter 60 in FIG. 3 is commonly used by those of ordinary skill in the art. Although filter 60 is similar to filter 46 of FIG. 2, filter 60 filters video data prior to that data entering picture buffer 44.

A filter 60 as used with the H.263 algorithm, as is known to those of ordinary skill in the art, is a block-edge filter applied on reconstructed data to reduce blocking artifacts. The filtering strength is fixed, but the active region is controlled on the quantization steps.

In each of the FIG. 2 and FIG. 3 cases, the filters function as intended. However, in both cases, the encoder and decoder must each have the same ones of the filters, in order for the decoded image to be properly viewed. For example, if a filter 46 is used, both encoder and decoder must have that filter 46. Alternatively, if a filter 60 is used, both encoder and decoder must have that filter 60.

A second drawback of the prior art filters is that one or more filter coefficients are fixed, rather than being variable which would add flexibility.

The present invention solves both of these problems by providing a filter that is utilized prior to DCT and quantization operations, and which does not have to be duplicated in the decoder apparatus.

OBJECTS AND ADVANTAGES OF THE INVENTION

It is an object and advantage of the present invention to provide a pre-DCT filtering apparatus for video streams.

It is a further object and advantage of the present invention to provide a video filter which is only required to be present in the encoding apparatus.

It is let a third object and advantage of the present invention to provide a filtering apparatus having variable filtering coefficients.

SUMMARY OF THE INVENTION

An apparatus for processing a video signal is described, comprising a means for receiving a nonreconstructed, video residue image, a means for selecting a first pixel to be processed, a means for selecting a second and third pixel, the second and third pixels being contiguous to said first pixel, and positioned right and left of the first pixel, a means for determining first, second, and third weighting factors for the first, second and third pixels respectively, a means for computing a first result by multiplying the first weighting factor with the value of said first pixel, a means for computing a second result by multiplying the second weighting factor with the value of the second pixel, a means for computing a third result by multiplying the third weighting factor with the value of the third pixel; and a means for computing a new value for said first pixel by adding the first, second and third results together.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 4:
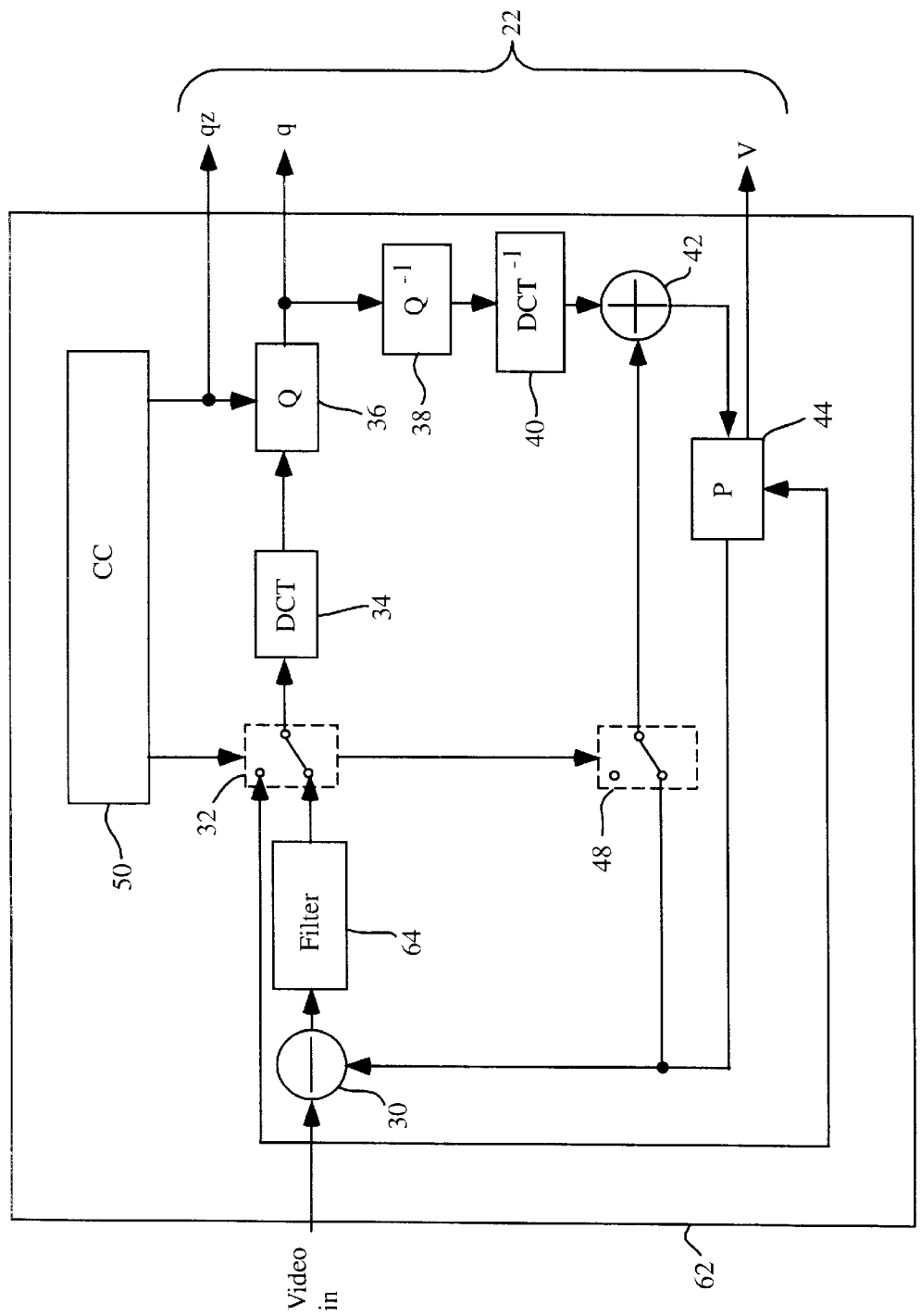
FIG. 4 is a schematic diagram of a DSP incorporating the present invention filtering apparatus.

FIG. 4 is a schematic diagram of a DSP incorporating the present invention filtering apparatus.

Figure 1:
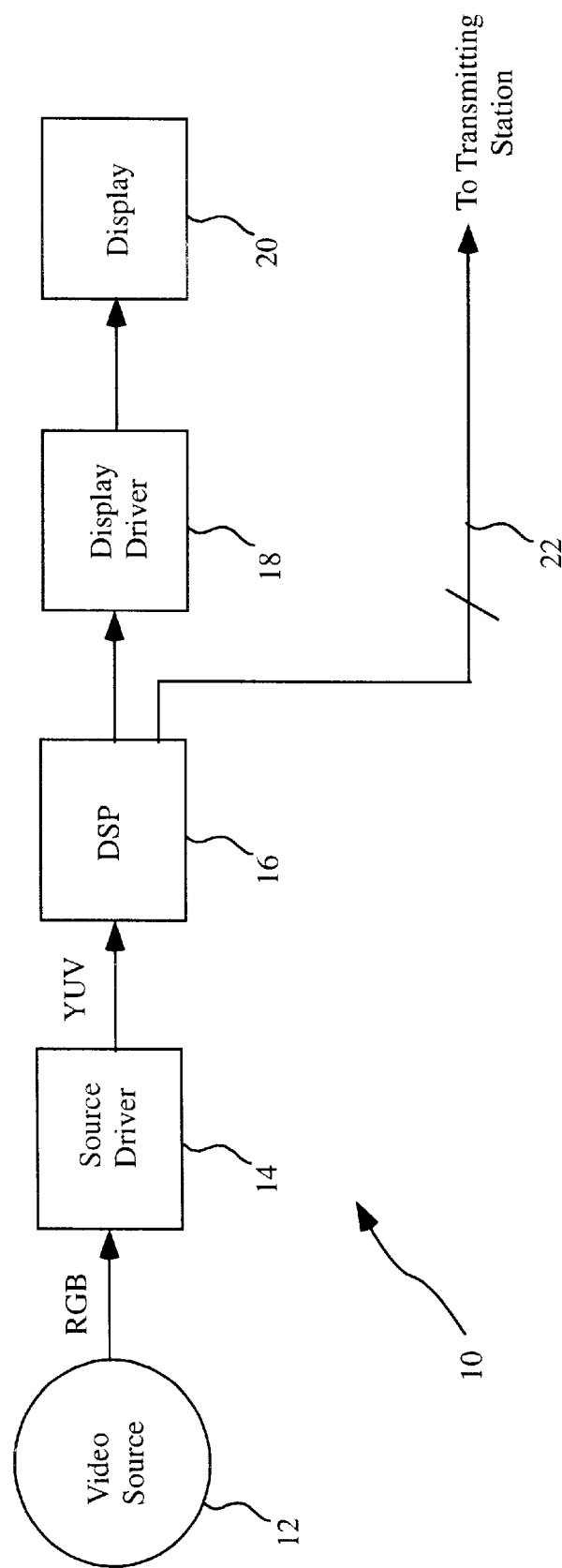
FIG. 1 is a schematic diagram of a generalized video processing system.
Figure 2:
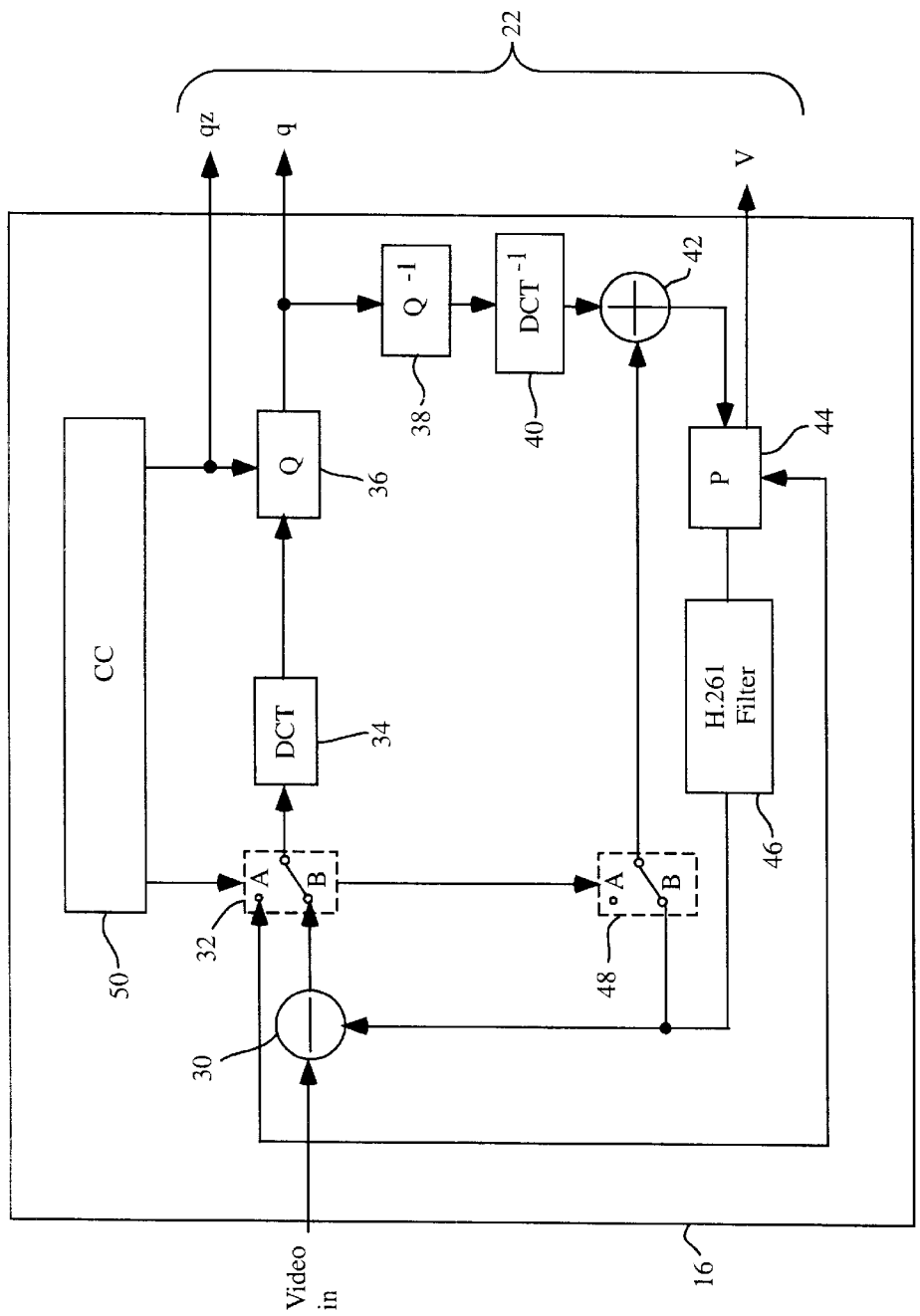
FIG. 2 is a schematic diagram of a prior art DSP using the H.261 algorithm and in-loop Filtering.
Figure 3:
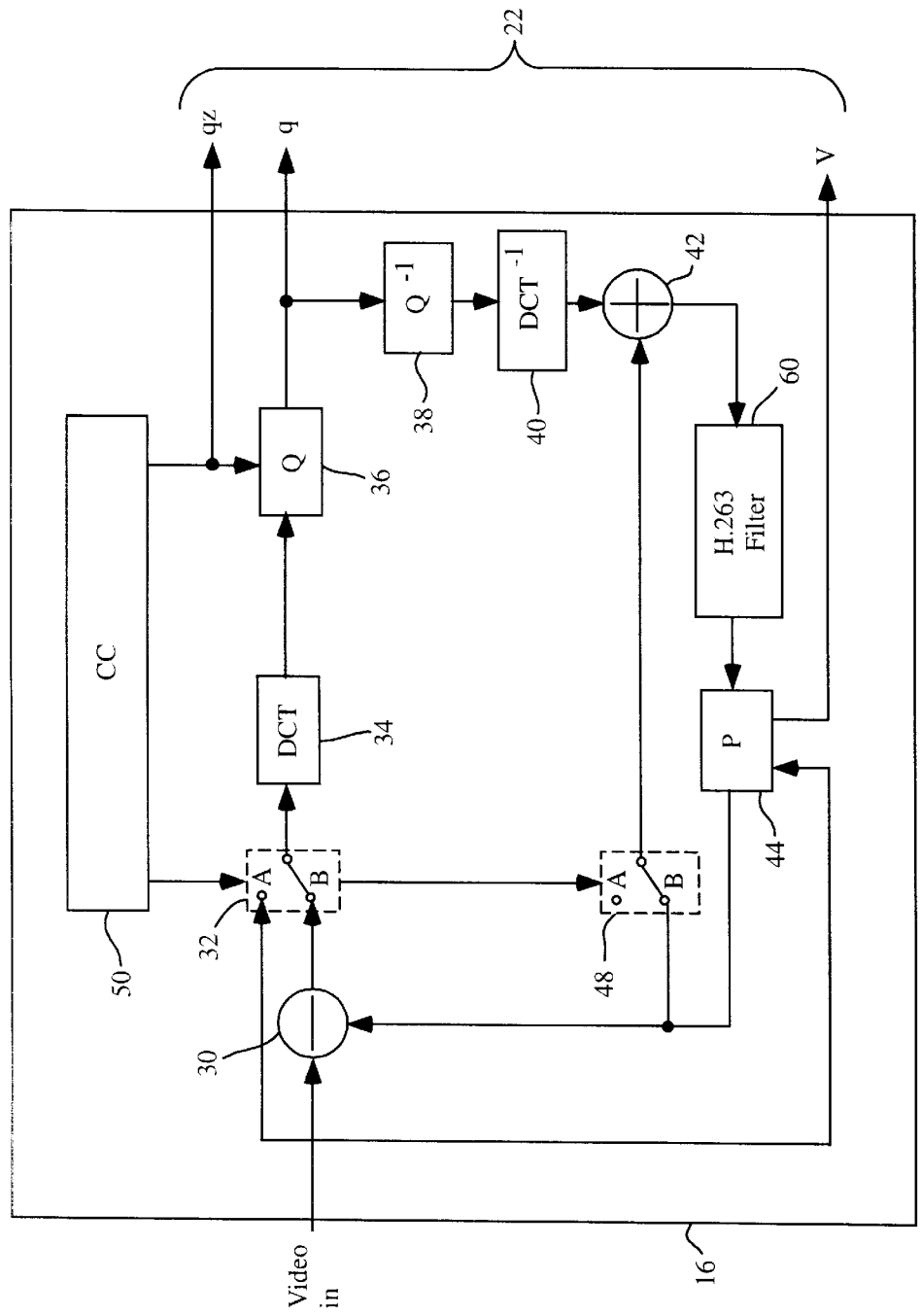
FIG. 3 is a schematic diagram of a prior art DSP using the H.263 algorithm and in-loop filtering.

Referring to FIG. 4, DSP 62 comprises the same features and structures as the apparatus of FIGS. 2 and 3, except for the absence of filter 46 from FIG. 2, the absence of filter 60 in FIG. 3, and the presence of present invention filter 64 of FIG. 4.

As will be understood by those of ordinary skill in the art, filter 64 of FIG. 4 performs a substantially different function that those functions performed by filters 46 and 60 of FIGS. 2 and 3 respectively.

Filters 46 and 60 operate on reconstructed data that has had DCT, quantization, inverse quantization, and inverse DCT operations performed on it. Present invention filter 64, however, operates on the residue image, the result of the difference operation performed at difference apparatus 30. Since the filter is outside the reconstruction process, there is no need for a similar filter 64 to be present in the decoder. Filter 64 only need be present in the encoder, a substantial savings in precious silicon real estate. The primary result of filtering residue data using present invention filter 64 is to reduce ringing artifacts which are a byproduct of quantization following DCT operations.

Filter 64 is a two dimensional spatial filter which uses the pixel values for a center pixel and each horizontally or vertically adjacent pixel, depending on whether filtering is being done horizontally or vertically at that time, to determine a possible new value for the center pixel.

Figure 5:
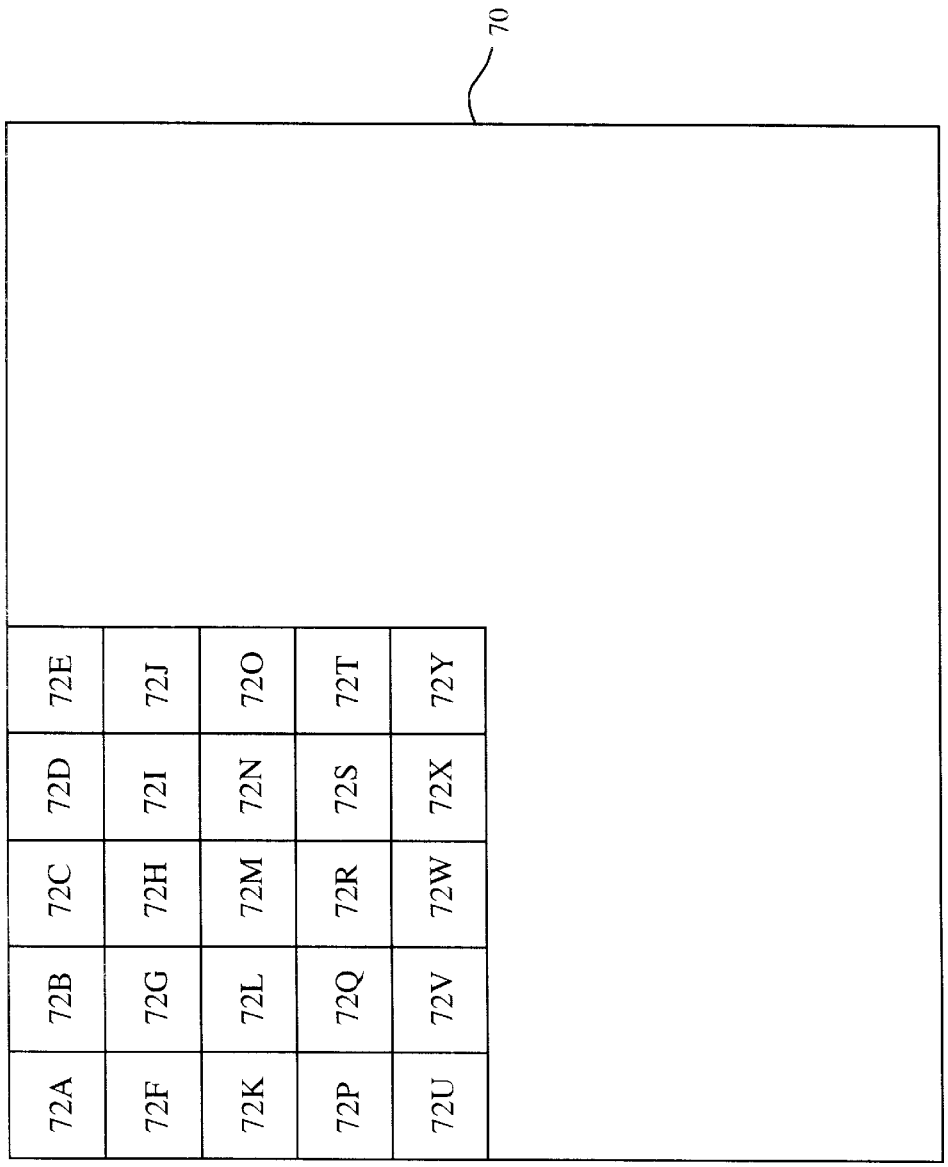
FIG. 5 is a diagram representing pixels being filtered using a presently preferred embodiment of the present invention.

FIG. 5 is a diagram representing pixels being filtered using a presently preferred embodiment of the present invention.

A presently preferred method of horizontal filtering is accomplished on a given pixel by analyzing the pixel on each side of the given pixel, and computing a possibly new value for the center pixel, using the formula $$P_n = a*P_{n-1} + b*P_n + a*P_{n+1}$$

Where $P_n$ is the center pixel, and $P_{n-1}$ and $P_{n+1}$ represent the values of the pixels before and after the center pixel, respectively. Coefficients a and b must satisfy $$2a+b=1$$

and a=Q/N
where N=128 for images in CIF format, and N=256 for images in QCIF format. Both image formats are well known to those of ordinary skill in the art.

Q is a variable representing a value between 2 and 31 which controls the amount of information transmitted over transmission lines 22. A target bit-rate is selected, and the actual bit-rate is measured. If the target bit-rate is greater than the measured bit-rate, then Q=Q−1. If the target bit-rate is less than the measured bit-rate, then Q=Q+1. By raising and lowering the value of Q, the controller 50 may keep the bit-rate at or very near the target, thus maximizing data throughput over transmission lines 22 to a receiver.

Referring to FIG. 5, pixel block 70 being analyzed comprises pixels 72A through 72Y in a rectangular array as depicted. A different number of rows or columns of pixels may be present with a block, without departing from the scope or purpose of the present invention.

Horizontal filtering is accomplished independently of vertical filtering. In each, however, similar concepts lie. Briefly, in horizontal filtering, 3×1 subsets of pixels are analyzed at once, beginning in the upper, left corner of a pixel block 70. Thus, pixels 72A, 72B, and 72C are all analyzed together, to determine if pixel 72B needs to be changed. Following the computation, a next set of three pixels is chosen, by merely moving right or left one pixel, so that a new set of three pixels is defined. In our example, pixel 72C would be the new center pixel, with pixels 72B and 72D being pixel $P_{n-1}$ and $P_{n+1}$ respectively.

Vertical filtering is accomplished in a fashion similar to horizontal filtering, except that 1×3 subsets are used, with the first subset of pixels possibly being pixels 72A, 72F, and 72K. Following the computation of a new value for pixel 72F in this example, a new set of pixels 72B, 72G, and 72L may be chosen, and a new value for pixel 72G computed.

In both horizontal and vertical filtering, filtering is complete when all pixels in a block such as block 70 have been horizontally and vertically filtered using the method described above.

Those of ordinary skill in the art, after becoming familiar with this disclosure, will readily recognize that many other filtering equations may be implemented in an apparatus, without departing from the scope or purpose of the present invention.

While embodiments and applications of this invention have been shown and described, it would be apparent to those skilled in the art that many more modifications than mentioned above are possible without departing from the inventive concepts herein. The invention, therefore, in not to be restricted except in the spirit of the appended claims.

What is claimed is:

1. A method for processing a video signal, comprising the steps of:
    receiving a nonreconstructed video residue image;
    selecting a first pixel to be processed;
    selecting second and third pixels, said second and third pixels being contiguous to said first pixel, and positioned right and left of said first pixel;
    determining first, second, and third weighting factors for said first, second and third pixels, respectively;
    computing a first result by multiplying said first weighting factor with the value of said first pixel;
    computing a second result by multiplying said second weighting factor with the value of said second pixel;
    computing a third result by multiplying said third weighting factor with the value of said third pixel; and
    computing a new value for said first pixel by adding said first, second and third results together;
        wherein said second and third weighting factors are equal to the quotient of a quantization factor divided by a value N, where N is directly proportional to the resolution of the image being filtered, and the quantization factor is a value between 2 and 31.

2. The method of claim 1 wherein said quantization factor is dynamically adjusted in order to maintain the data throughput of the filter at optimum.

3. An apparatus for processing a video signal, comprising:
    means for receiving a nonreconstructed video residue image;
    means for selecting a first pixel to be processed;
    means for selecting second and third pixels, said second and third pixels being contiguous to said first pixel, and positioned right and left of said first pixel;
    means for determining first, second, and third weighting factors for said first, second and third pixels, respectively;
    means for computing a first result by multiplying said first weighting factor with the value of said first pixel;
    means for computing a second result by multiplying said second weighting factor with the value of said second pixel;
    means for computing a third result by multiplying said third weighting factor with the value of said third pixel; and
    means for computing a new value for said first pixel by adding said first, second and third results together;
        wherein said second and third weighting factors are equal to the quotient of a quantization factor divided by a value N, where N is directly proportional to the resolution of the image being filtered, and the quantization factor is a value between 2 and 31.

4. The apparatus of claim 3 wherein said quantization factor is dynamically adjusted in order to maintain the data throughput of the filter at optimum.

5. A method for processing a video signal, comprising the steps of:
    receiving a nonreconstructed, video residue image;
    selecting a first pixel to be processed;
    selecting second and third pixels, said second and third pixels being contiguous to said first pixel, and positioned above and below said first pixel;
    determining first, second, and third weighting factors for said first, second and third pixels respectively;
    computing a first result by multiplying said first weighting factor with the value of said first pixel;
    computing a second result by multiplying said second weighting factor with the value of said second pixel;
    computing a third result by multiplying said third weighting factor with the value of said third pixel; and
    computing a new value for said first pixel by adding said first, second and third results together;
        wherein said second and third weighting factors are equal to the quotient of a quantization factor divided by a value N, where N is directly proportional to the resolution of the image being filtered, and the quantization factor is a value between 2 and 31.

6. The method of claim 5 wherein said quantization factor is dynamically adjusted in order to maintain the data throughput of the filter at optimum.

7. A method for processing a video signal, comprising the steps of:
    receiving a nonreconstructed, video residue image;
    selecting a first pixel to be processed;
    selecting second and third pixels, said second and third pixels being contiguous to said first pixel, and positioned above and below said first pixel;
    determining first, second, and third weighting factors for said first, second and third pixels respectively;
    computing a first result by multiplying said first weighting factor with the value of said first pixel;
    computing a second result by multiplying said second weighting factor with the value of said second pixel;
    computing a third result by multiplying said third weighting factor with the value of said third pixel; and
    computing a new value for said first pixel by adding said first, second and third results together;
        wherein said second and third weighting factors are equal to the quotient of a quantization factor divided by a value N, where N is directly proportional to the resolution of the image being filtered, and the quantization factor is a value between 2 and 31.

8. The method of claim 7 wherein said quantization factor is dynamically adjusted in order to maintain the data throughput of the filter at optimum.

* * * * *